US012560906B2

(12) United States Patent
McCutcheon et al.

(10) Patent No.: US 12,560,906 B2
(45) Date of Patent: Feb. 24, 2026

(54) SURFACE LATTICE STRUCTURE FORMATION

(71) Applicant: Peridot Print LLC, Palo Alto, CA (US)

(72) Inventors: James Andrew McCutcheon, Vancouver, WA (US); Alberto Maria Canals Pou, Sant Cugat del Valles (ES); Geoffrey Schmid, San Diego, CA (US)

(73) Assignee: PERIDOT PRINT LLC, Palo Alto, CA (US)

( * ) Notice: Subject to any disclaimer, the term of this patent is extended or adjusted under 35 U.S.C. 154(b) by 356 days.

(21) Appl. No.: 18/032,988

(22) PCT Filed: Oct. 29, 2020

(86) PCT No.: PCT/US2020/057852
§ 371 (c)(1),
(2) Date: Apr. 20, 2023

(87) PCT Pub. No.: WO2022/093223
PCT Pub. Date: May 5, 2022

(65) Prior Publication Data
US 2023/0384761 A1 Nov. 30, 2023

(51) Int. Cl.
G05B 19/4099 (2006.01)
(52) U.S. Cl.
CPC ............... G05B 19/4099 (2013.01); *G05B 2219/35134* (2013.01)

(58) Field of Classification Search
CPC ...... G05B 19/4099; G05B 2219/35134; G06T 2219/2021; G06T 17/10; G06T 19/20;
(Continued)

(56) References Cited

U.S. PATENT DOCUMENTS 9,811,620 B2 11/2017 Ruto et al.
10,343,725 B2 7/2019 Martin et al.
(Continued)

FOREIGN PATENT DOCUMENTS

RU 2611892 C1 3/2017
WO 2018/054502 A1 3/2018

OTHER PUBLICATIONS

Aremu et al. "A voxel-based method of constructing and skinning conformal and functionally graded lattice structures suitable for additive manufacturing" from "Additive Manufacturing 13 (2017) 1-13" (hereinafter Aremu) (Year: 2017).*
(Continued)

*Primary Examiner* — Yuhui R Pan
(74) *Attorney, Agent, or Firm* — Michael Dryja

(57) ABSTRACT
In some examples, a system defines sub-volumes within a bounding object based on beams of a unit cell of a lattice structure for a 3D object to be built. The sub-volumes are defined based on the beams cutting through the bounding object that contains the unit cell. The system intersects the sub-volumes of the bounding object with a trimmed version of the lattice structure. The system forms a surface lattice structure having beams identified based on the intersecting, the beams of the surface lattice structure to connect to unit cells of the trimmed version of the lattice structure.

15 Claims, 9 Drawing Sheets

330

(58) Field of Classification Search
    CPC ..... B33Y 50/02; B33Y 10/00; G06F 2113/10;
                                   G06F 30/20
    See application file for complete search history.

(56) References Cited

U.S. PATENT DOCUMENTS

| | | |
|---|---|---|
| 2016/0209820 A1 | 7/2016 | Banadyga et al. |
| 2017/0011155 A1 | 1/2017 | Ruto et al. |
| 2018/0365342 A1 | 12/2018 | Allen et al. |
| 2019/0197205 A1* | 6/2019 | Schmidt .................. G06T 17/20 |
| 2019/0232555 A1 | 8/2019 | Shaw et al. |

OTHER PUBLICATIONS

Aremu, A.O., "A voxel-based method of constructing and skinning conformal and functionally graded lattice structures suitable for additive manufacturing", Elsevier, vol. 13, Jan. 2017, pp. 13.
Close Hewlett-Packard Development Company, L.P., International Appl. No. PCT/US2020/038028 entitled Perforations in a Membrane for a Lattice Structure filed Jun. 17, 2020, pp. 33.

\* cited by examiner

108

108

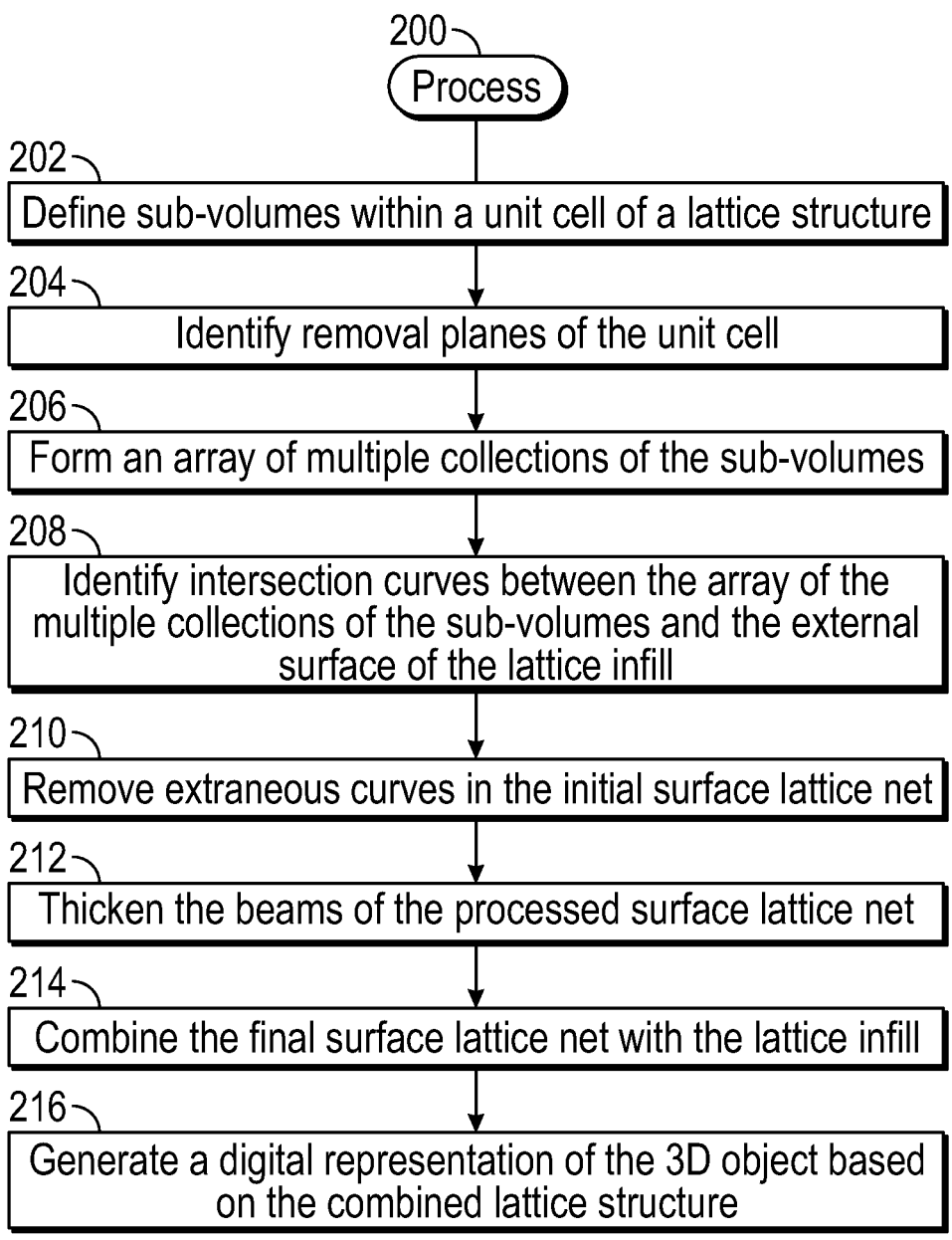

200 ⌐
Process

202 ⌐
Define sub-volumes within a unit cell of a lattice structure

204 ⌐
Identify removal planes of the unit cell

206 ⌐
Form an array of multiple collections of the sub-volumes

208 ⌐
Identify intersection curves between the array of the multiple collections of the sub-volumes and the external surface of the lattice infill 210 ⌐
Remove extraneous curves in the initial surface lattice net 212 ⌐
Thicken the beams of the processed surface lattice net 214 ⌐
Combine the final surface lattice net with the lattice infill 216 ⌐
Generate a digital representation of the 3D object based on the combined lattice structure

Storage Medium

402 —
Sub-Volume Definition Instructions

404 —
Sub-Volume/Trimmed Lattice Structure Intersection Instructions

406 —
Surface Lattice Structure Formation Instructions

500

600

Process

SURFACE LATTICE STRUCTURE FORMATION

BACKGROUND

An additive manufacturing machine can be used to form a lattice structure, such as a foam layer used in consumer and sporting goods, in vehicles, and so forth. Additive manufacturing machines produce three-dimensional (3D) objects by accumulating layers of build material, including a layer-by-layer accumulation and solidification of the build material patterned from computer aided design (CAD) models or other digital representations of physical 3D objects to be formed. A type of an additive manufacturing machine is referred to as a 3D printing system. Each layer of the build material is patterned into a corresponding part (or parts) of the 3D object.

BRIEF DESCRIPTION OF THE DRAWINGS

Some implementations of the present disclosure are described with respect to the following figures.

FIG. 2 is a flow diagram of a process of generating a digital representation of a three-dimensional (3D) object that is based on combining a surface lattice net with a lattice infill, according to some examples.

Figure 1B:
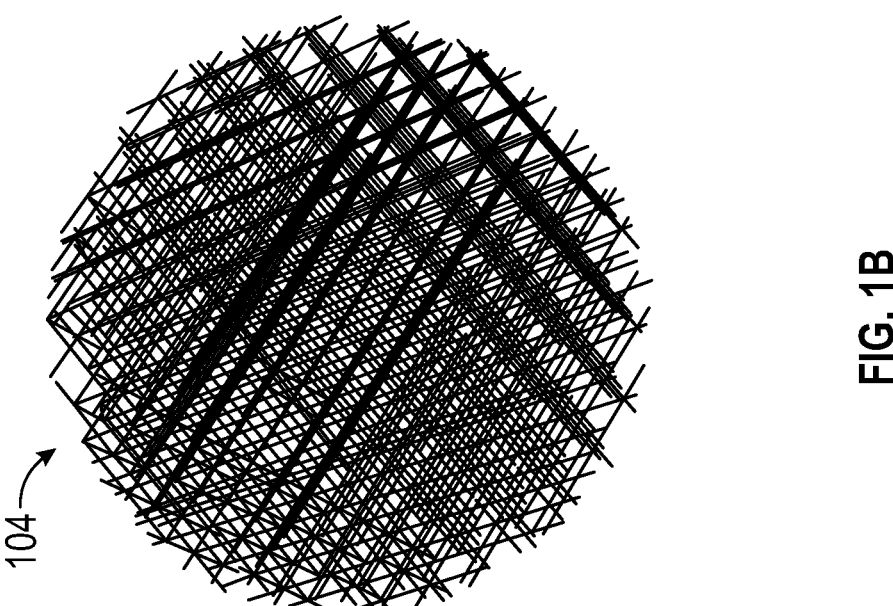
FIGS. 1A-1D are views of lattice structures according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A lattice structure refers to a physical structure having an interlaced pattern of connecting members that are interconnected with one another. The connecting members can be referred to as "beams." A beam can refer to a generally elongated member within the lattice structure. The beam can be straight or can be curved. A lattice structure can include an arrangement of unit cells, where the unit cells are repeated and interconnected to one another to define a lattice. A "unit cell" of a lattice structure includes an arrangement of beams.

An additive manufacturing machine can be used to build a lattice structure. A digital representation (e.g., a CAD file) of a 3D object to be built is provided to the additive manufacturing machine to allow the additive manufacturing machine to build the 3D object on a layer-by-layer basis. The digital representation of a target 3D object that includes a lattice structure includes an arrangement of the unit cells that make up the lattice structure. The digital representation specifies an interconnection of the unit cells to form the target 3D object. The additive manufacturing machine builds the arrangement of unit cells on a layer-by-layer basis.

Building a lattice structure with an additive manufacturing machine can allow for better control of mechanical characteristics of the lattice structure than possible with other manufacturing techniques. For example, a digital representation of the lattice structure can be adjusted to change properties (e.g., compressibility, smoothness, volume of each unit cell, mechanical strength, etc.) of the lattice structure.

In some examples, a lattice structure is compressible based on the material used to form the lattice structure, where the material can include a thermoplastic polyurethane material or another elastomeric material. In other examples, lattice structures can be rigid, where the material for a rigid lattice structure can include a metal, a plastic, and so forth.

Objects built using lattice structures can have complex geometries. Examples of objects with complex geometries include spherical objects, objects with irregular surfaces (e.g., footwear, a helmet, a seat cushion, a medical device, etc.). More generally, an object has a complex geometry if any surface of the object is not flat (or planar).

When building a 3D object having a complex geometry by an additive manufacturing machine, a lattice structure having an initial geometry (e.g., a cuboid) may first be defined. Note that defining the lattice structure having the initial geometry is done digitally, such as by use of a CAD tool or another program executed in a computer system when creating a digital representation of the 3D object to be built. The lattice structure having the initial geometry is then trimmed (digitally using a program) to form a trimmed lattice structure that has a target complex geometry. For example, a lattice structure that is initially in the shape of a cuboid can be trimmed to form a spherical lattice structure.

The trimming of the lattice structure for the 3D object can result in beams of unit cells (at the external surface of the trimmed lattice structure) being removed completely, such that the unit cells at the surface of the trimmed lattice structure may have an incomplete arrangement of beams (i.e., a beam or multiple beams has or have been removed). Further, some beams of unit cells at the external surface of the trimmed lattice structure may be partially cut. A partially cut beam is referred to as a "hanging" beam.

Unit cells (at the external surface of the trimmed lattice structure) with an incomplete arrangement of beams and/or hanging beams may not accurately represent properties (e.g., a shape, a mechanical strength, a compressibility, smoothness, etc.) of the external surface of a 3D object if built by an additive manufacturing machine based on the trimmed lattice structure.

The trimmed lattice structure may cause the 3D object to have a shape that deviates from a target shape. Although the general geometry of the trimmed lattice structure can provide some rough representation of the general shape of the external surface of the 3D object, the accuracy of this representation is reduced as the size of unit cells of the lattice structure increases, or as the spacing between beams in unit cell increases, or the length between portions of the external surface of the 3D object with different geometries decreases.

The trimmed lattice structure may also cause the 3D object to have a mechanical property that deviates from a target mechanical property.

As a result, a 3D object built based on the trimmed lattice structure may have properties that adversely impact user experience in scenarios where a user is to interact with the 3D object being built (e.g., footwear worn by the user, a seat cushion on which the user sits, helmet that the user uses, etc.). For example, the 3D object built based on the trimmed lattice structure may become easily deformable and may not be able to retain its target shape or recover to its target shape after compression of the trimmed lattice structure. As another example, the 3D object built based on trimmed lattice structure may feel rough to the touch.

In accordance with some implementations of the present disclosure, a surface lattice structure is formed to connect to a trimmed lattice structure. The surface lattice structure re-creates the surface geometry of a target 3D object to be built, such as by an additive manufacturing machine.

Figure 1A:
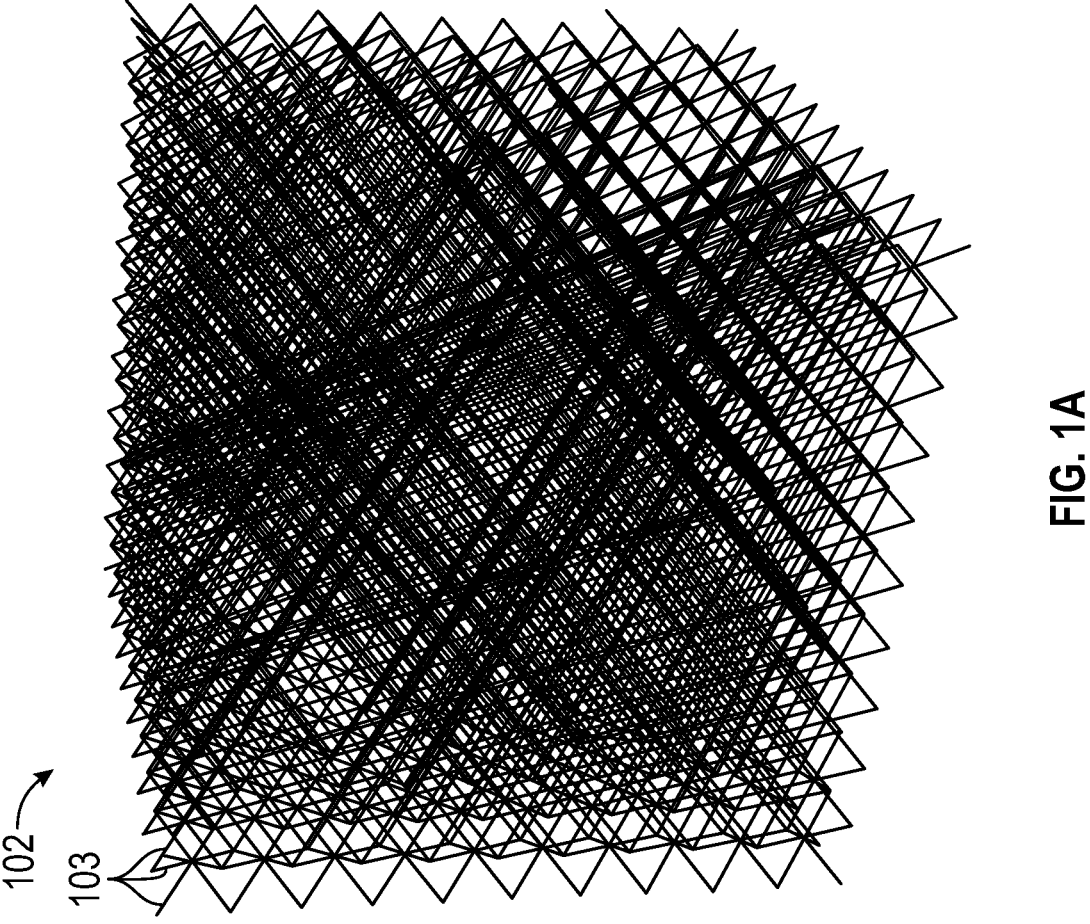

FIG. 1A shows an initial lattice structure 102 that has a cuboid bounding shape. The initial lattice structure 102 may have been created using a CAD tool or other program executed in a computer system. The initial lattice structure 102 includes an interconnected arrangement of unit cells each having an arrangement of beams (some beams are identified as 103 in FIG. 1A).

After the initial lattice structure 102 is created, the program can be used to trim the initial lattice structure 102 to a target shape, which in the example is a spherical shape. FIG. 1B shows a trimmed lattice structure 104 (which is spherical, for example) formed by trimming the initial lattice structure 102 to the spherical shape of FIG. 1B. The trimming of the initial lattice structure 102 results in removal or partial cutting of beams of unit cells at the external surface of the trimmed lattice structure 104. The removed beams are no longer present in the trimmed lattice structure 104, and partially cut beams form hanging beams in the trimmed lattice structure 104.

In accordance with some implementations of the present disclosure, techniques or mechanisms are provided to build a surface lattice structure that is to be combined with the trimmed lattice structure 104 to form a combined lattice structure. Different views of a surface lattice structure created using techniques according to some implementations of the present disclosure are shown in FIGS. 1C and 1D.

In the ensuing discussion, a surface lattice structure is referred to as a "surface lattice net," and a trimmed lattice structure is referred to as a "lattice infill." A surface lattice net is to surround a lattice infill such that the surface lattice net forms the outer portion of a combined lattice structure that includes the combination of the surface lattice net and the lattice infill. By surrounding the lattice infill with the surface lattice net, the surface lattice net would define an external surface of a 3D object built based on the combined lattice structure, such that undesirable properties associated with removed beams and/or hanging beams of the lattice infill would no longer present an issue.

Figure 1C:
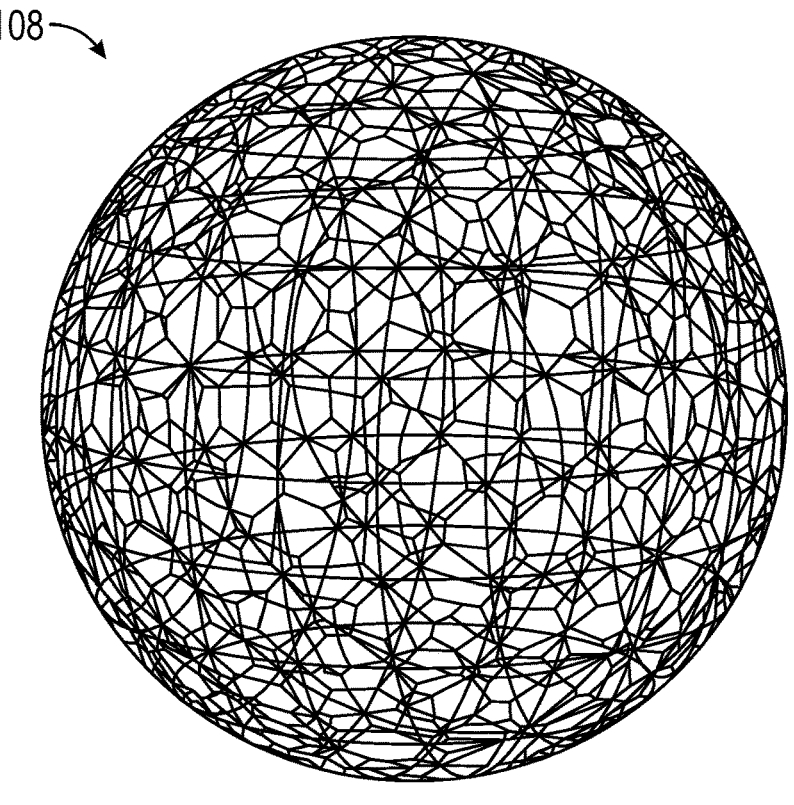
Figure 1D:
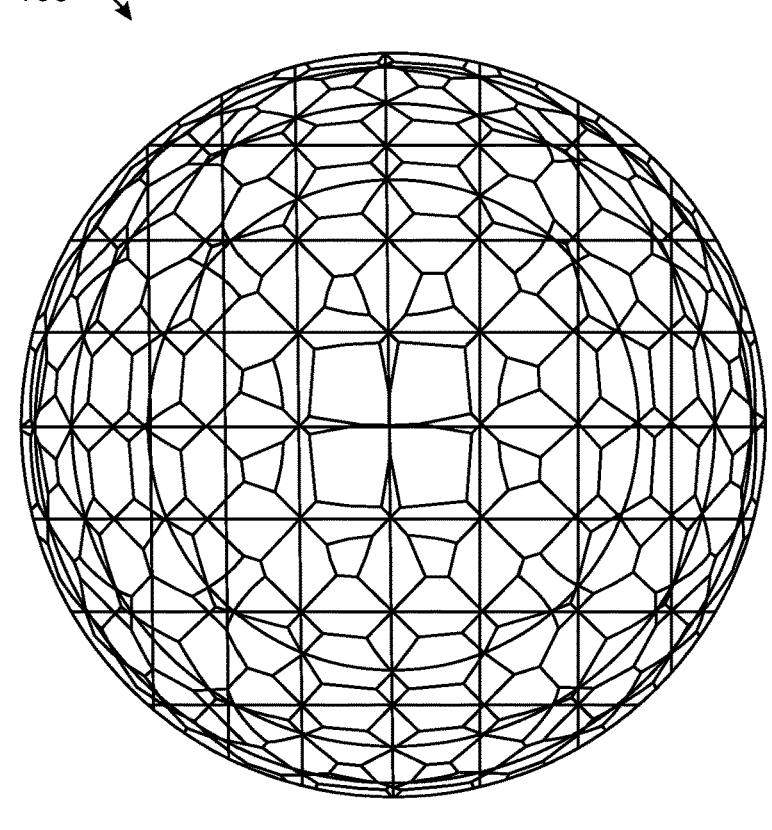

FIG. 1C is a perspective view of a surface lattice net 108, and FIG. 1D is a top view of the surface lattice net 108. In the top view shown in FIG. 1D, the beams (which are the interconnecting members that are connected to one another shown in FIGS. 1C and 1D) are generally aligned so that the beams are more visible. In the perspective view of the surface lattice net 108 shown in FIG. 1C, beams of different portions of the surface lattice net 108 overlap one another so that individual beams are less apparent.

FIG. 2 is a flow diagram of a process 200 according to some implementations of the present disclosure of forming a combined lattice structure based on creating a surface lattice net for connection to a lattice infill. The discussion of the process 200 of FIG. 2 is made in conjunction with FIGS. 3A-3K. The process 200 can be performed by machine-readable instructions executed in a computer system.

As a result of the trimming of an initial lattice structure to form a lattice infill (trimmed lattice structure), beams that are removed from unit cells at the external surface of the lattice infill and hanging beams at the external surface of the lattice infill result in loss of information relating to how the beams of the unit cells at the external surface of the lattice infill are connected to adjacent unit cells. In accordance with some implementations of the present disclosure, rather than recreate information that has been removed by the trimming in an attempt to connect the trimmed unit cells at the external surface of the lattice infill to unit cells of a surface lattice net, information can be derived based on sub-volumes split by beams of a unit cell. The derived information can be used to connect the trimmed unit cells at the external surface of the lattice infill to a surface lattice net, as explained below.

Figure 3A:
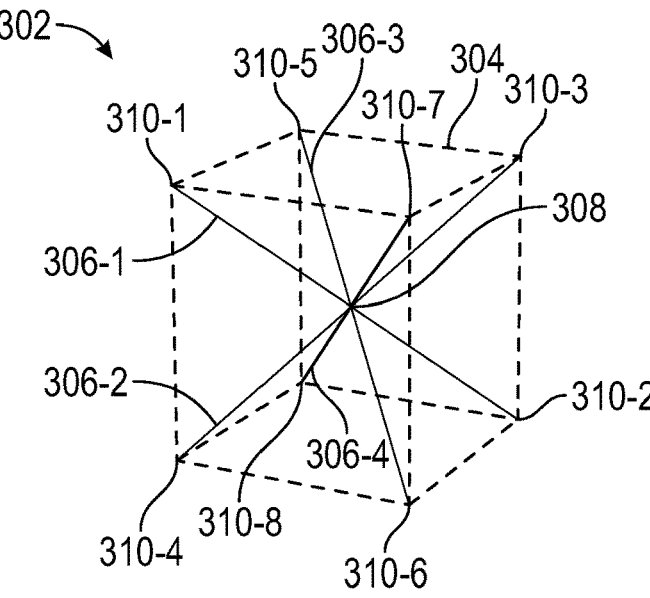
FIG. 3A shows a bounding object and beams of a unit cell, according to some examples.

The process 200 defines (at 202) sub-volumes within a unit cell of a lattice structure, such as a unit cell 302 shown in FIG. 3A. The unit cell 302 has a bounding object 304 (shown in dashed profile), which defines the outermost perimeter in 3D space of the unit cell 302. In the example of FIG. 3A, the bounding object 304 is in the form of a bounding cube. In other examples, the bounding object 304 can have other shapes, such as a hexagonal prism, a truncated octahedron, or any other shape that can be tessellated. Note that the bounding object 304 is depicted to represent the outermost perimeter of the unit cell 302—the bounding object 304 itself is not part of the beams of the unit cell 302 that are used to form a lattice structure for a 3D object to be built.

The unit cell 302 includes beams 306-1, 306-2, 306-3, and 306-4 that are contained within the bounding object 304. In the example of FIG. 3A, the beams 306-1, 306-2, 306-3, and 306-4 intersect at an intersection point 308, which in the example of FIG. 3A is a centroid of the bounding object 304. The beam 306-1 extends from a corner 310-1 to a corner 310-2 of the bounding object 304. The beam 306-2 extends from a corner 310-3 to a corner 310-4 of the bounding object 304. The beam 306-3 extends from a corner 310-5 to a corner 310-6 of the bounding object 304. The beam 306-4 extends from a corner 310-7 to a corner 310-8 of the bounding object 304.

Although FIG. 3A shows an example of a unit cell with four beams 306-1, 306-2, 306-3, and 306-4, it is noted that in other examples, a unit cell can have a more complex arrangement of beams. Note also that the beams of a unit cell can intersect at multiple points within the bounding object of the unit cell.

Figure 3B:
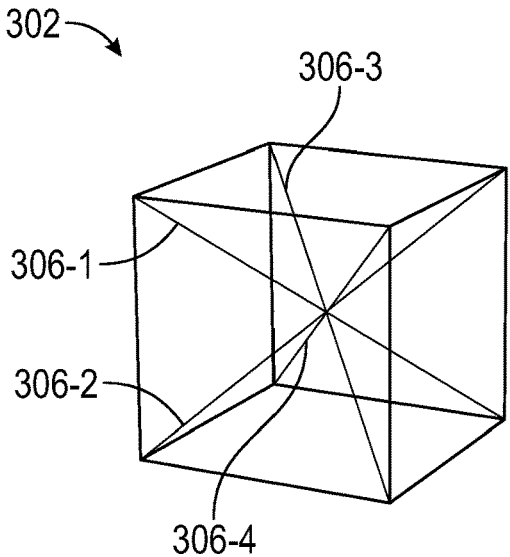
FIGS. 3B-3F show sub-volumes defined using the beams in the bounding object, according to some examples.
Figure 3C:
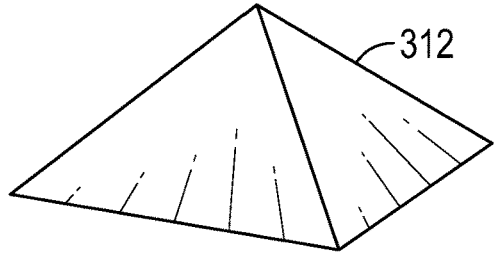
Figure 3D:
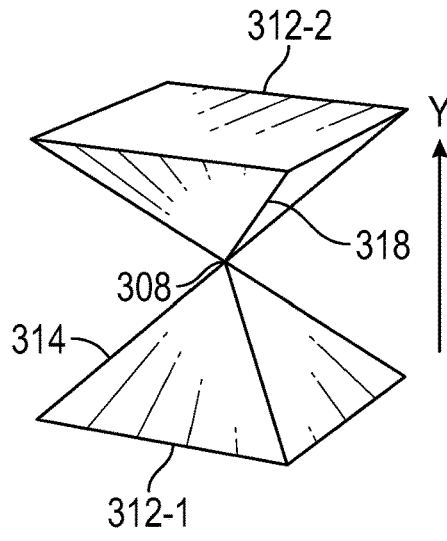
Figure 3E:
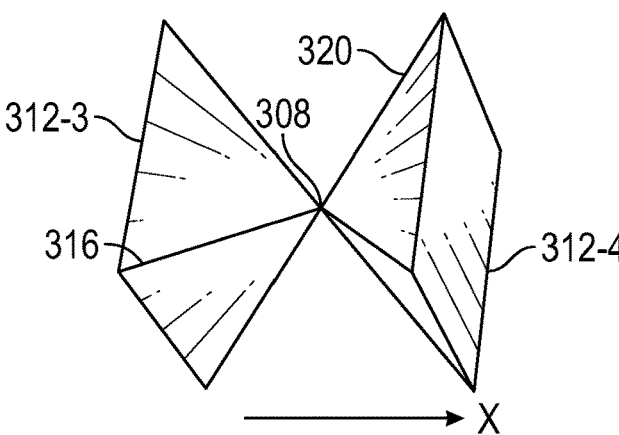
Figure 3F:
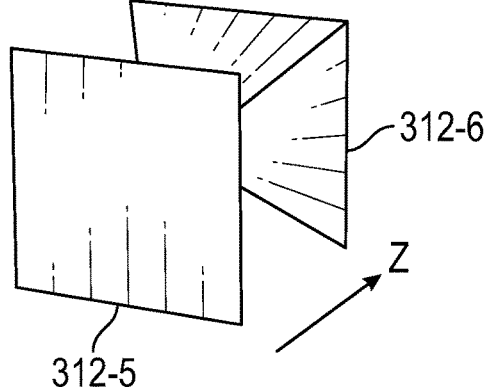

The beams 306-1, 306-2, 306-3, and 306-4 split the unit cell 302 into multiple sub-volumes, as shown in FIGS. 3B-3F. Based on the arrangement of the beams 306-1, 306-2, 306-3, and 306-4, the unit cell 302 is split into six pyramids, with a pyramid 312 shown in FIG. 3C. Each pyramid 312 is a sub-volume of the unit cell 302. FIG. 3D shows two pyramids (two sub-volumes) 312-1 and 312-2 with their tips touching each other at the intersection point 308, to form a pair of opposing pyramids 312-1 and 312-2 with the tips of the opposing pyramids 312-1 and 312-2 touching at the intersection point 308. The pair of opposing pyramids 312-1 and 312-2 are aligned along a Y axis. FIG. 3E shows another pair of opposing pyramids 312-3 and 312-4 aligned along an X axis, and FIG. 3F shows a further pair of opposing pyramids 312-5 and 312-6 aligned along a Z axis. The X, Y, and Z axes are orthogonal with respect to one another. A pair of opposing pyramids are aligned with respect to a given axis (X, Y, or Z) if the flat surfaces of the pyramids in the pair are perpendicular to the given axis.

Although FIGS. 3B-3D show an example where the unit cell is split by beams of the unit cell into sub-volumes in the shape of pyramids, it is noted that in other examples, other arrangements of beams in a unit cell can split the unit cell into sub-volumes of other shapes. In some cases, the beams of a unit cell can split the unit cell into sub-volumes of multiple different shapes.

Each sub-volume (312-1 to 312-6) in the unit cell 302 represents a respective space between adjacent beams in the unit cell 302. Stated another way, each sub-volume is bounded by adjacent beams.

The edges of the sub-volumes 312-1 to 312-6 defined by the beams 306-1, 306-2, 306-3, and 306-4 are curves that shared by adjacent sub-volumes. For example, the edge 314 of the pyramid 312-1 in FIG. 3D is shared with an edge 316 of the pyramid 312-3 in FIG. 3E. Similarly, an edge 318 of the pyramid 312-2 in FIG. 3D is shared with an edge 320 of the pyramid 312-4 in FIG. 3E.

The edges of the sub-volumes 312-1, 312-2, 312-3, 312-4, 312-5, and 312-6 provide information on how the different beams 306-1, 306-2, 306-3, and 306-4 connect to one another. For example, the fact that the edge 314 of the sub-volume 312-1 and the edge 316 of the sub-volume 312-3 are shared with one another indicates that the shared edge 314-316 is part of a beam.

The sub-volumes for a unit cell form a collection of sub-volumes.

The process 200 identify (at 204) removal planes of the unit cell 302. The removal planes are planes along the boundary of the bounding object 304. In the example where the bounding object 304 is a cuboid, the boundary of the cuboid is along the outer 12 edges of the cuboid. In such an example, the removal planes are the planes parallel to the six outer faces cuboid—three outer faces 321-1, 321-2, and 321-3 of the cuboid defined by the bounding object 304 are visible in the view of FIG. 3G. Beams formed along the removal planes are extraneous beams that should be removed (discussed further below).

Figures 3G, 3H:
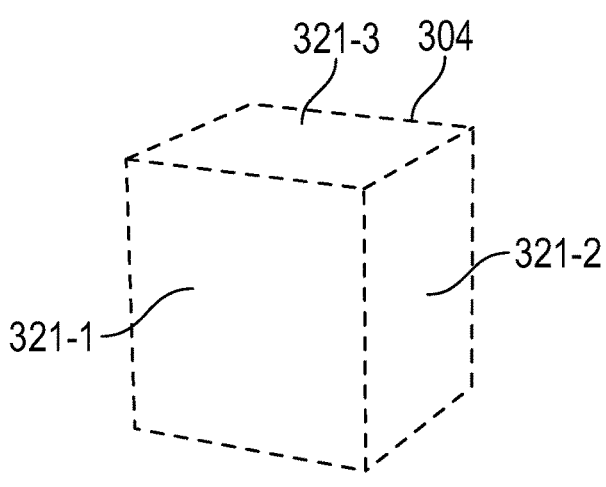
FIG. 3G shows boundaries of a bounding object, according to some examples.
FIG. 3H shows an array of multiple sets of sub-volumes, according to some examples.

The process 200 forms (at 206) an array of multiple collections of the sub-volumes defined at 202. Each collection of sub-volumes includes the sub-volumes shown in FIG. 3B. An example array 322 of multiple collections of sub-volumes is shown in FIG. 3H. In FIG. 3H, the array 322 of multiple collections of the sub-volumes forms a cuboid, which has the size of the initial lattice structure 102 (FIG. 1A) prior to trimming of the initial lattice structure 102.

The process 200 identifies (at 208) intersection curves between the array 322 of multiple collections of sub-volumes and the external surface of the lattice infill (trimmed lattice structure) 104 (FIG. 1B) using an intersection algorithm. Any of various available different intersection algorithms for identifying intersection curves can be employed. Note that a "curve" can refer to a straight line or to a curve that is not straight. Examples of intersection algorithms that may be employed include intersection algorithms provided by CAD tools or other geometric design software.

In performing the intersection, the positions of the array 322 of multiple collections of sub-volumes and the lattice infill 104 are aligned to the respective positions of the initial lattice structure 102 (FIG. 1A) and the trimmed lattice structure 104 (FIG. 1B). Note that during trimming, the initial lattice structure 102 is located at a particular position, and the position of the lattice infill 104 after the trimming is based on the particular position of the initial lattice structure 102. Aligning the positions of the array 322 of multiple collections of sub-volumes and the lattice infill 104 can be performed by setting the locations of the eight corners (324-1, 324-2, 324-3, 324-4, 324-5, 324-6, and 324-7 visible in FIG. 3H) of the cuboid of sub-volumes shown in FIG. 3H to the same locations of the corresponding corners of the initial lattice structure 102 prior to trimming, and setting the position of lattice infill 104 to the position of FIG. 1B after trimming.

Intersections between the multiple collections of sub-volumes of the array 232 and the unit cells at the external surface of the lattice infill 104 occur at points between edges (which are curves) of the sub-volumes and corresponding curves in the unit cells at the external surface of the lattice infill. A collection of curves at the intersection points make up the surface lattice net. The collection of curves correspond to beams of unit cells that were removed or partially cut by the trimming. The beams corresponding to the collection of curves are part of the unit cells that make up the surface lattice net.

Figure 3I:
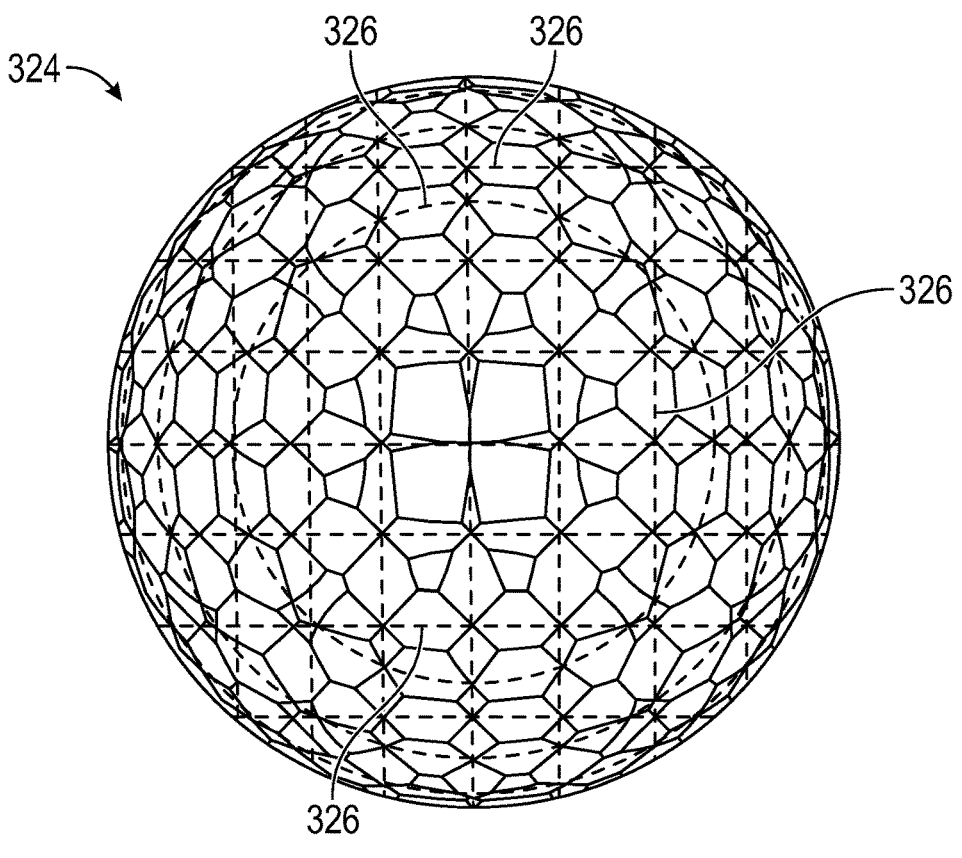
FIGS. 3I-3K show lattice surface nets formed according to some examples.

FIG. 3I shows an initial surface lattice net 324 that includes a layer of unit cells (having the shape of a sphere in the example to correspond to the spherical shape of a target 3D object to be built). This layer of unit cells includes the beams corresponding to the collection of curves identified at the intersection points between the multiple collections of sub-volumes of the array 232 and the unit cells at the external surface of the lattice infill 104. Note that the initial surface lattice net 324 can include multiple layers of unit cells, where the innermost layer of unit cells connect to the unit cells at the external surface of the lattice infill 104.

Note that the initial surface lattice net 324 includes extraneous beams formed in the removal planes identified at 204. The extraneous beams correspond to curves at the interface between adjacent boundaries (boundaries defined by respective bounding objects 304) of unit cells. The lattice curves that connect in the space at the interface between adjacent boundaries of unit cells define a single sub-volume between the two adjacent unit cells, but as the sub-volumes are modelled from a single unit cell, the array 322 of multiple collections of sub-volumes contains two volumes in this space, each representing half of the total space. The surface between these two sub-volumes leads to extraneous curves that are to be removed.

FIG. 3I shows the extraneous curves as dashed curves, such as curves 326. The solid curves shown in FIG. 3I correspond to the beams of the initial surface lattice net 324 that are not to be removed.

The process 200 removes (at 210) extraneous curves (shown in dashed profile in FIG. 3I) in the initial surface lattice net 324 along the removal planes. Any curves in the removal planes are identified and removed at 210.

Figure 3J:
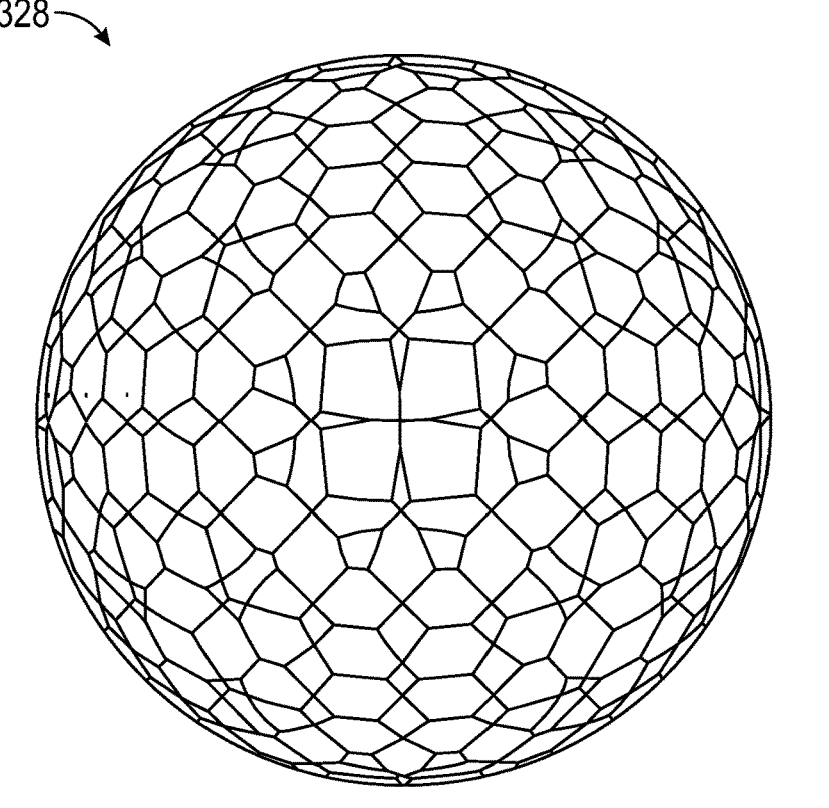

After the removal of the extraneous curves, a processed surface lattice net 328 shown in FIG. 3J is formed.

Figure 3K:
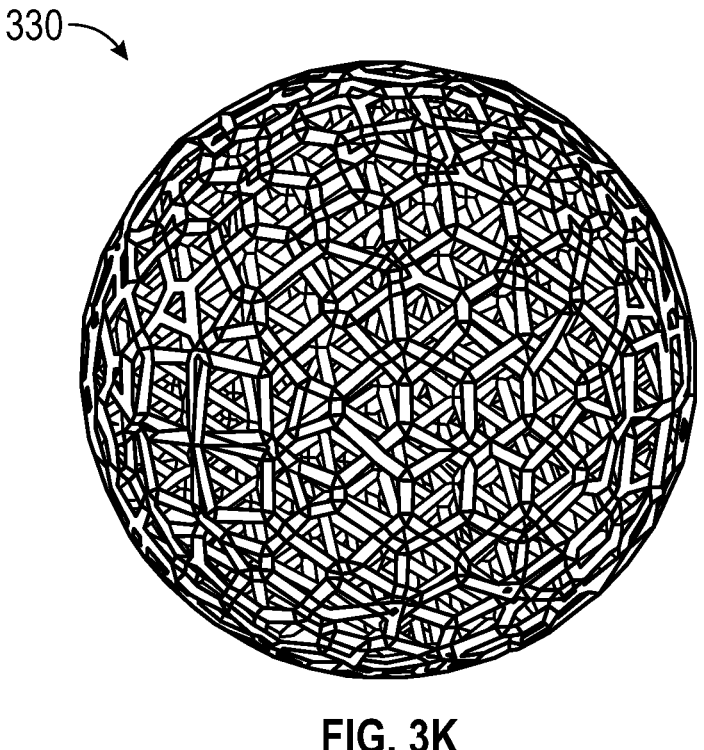

In some examples, the process 200 thickens (at 212) the beams of the processed surface lattice net 328, to form thickened beams in a final surface lattice net 330 as shown in FIG. 3K. Thickening the beams of the processed surface lattice net 328 refers to increasing a dimension (e.g., a width, a diameter, etc.) of the beams so that the beams become thicker as compared to the beams of the processed surface lattice net 328. The thickness of the thickened beams in the final surface lattice net 330 can correspond to thickness of the beams of the lattice infill 104.

The process 200 combines (at 214) the final surface lattice net 328 with the lattice infill 104 (FIG. 1B), to form a combined lattice structure where the external surface of the combined lattice structure has a target property (e.g., a shape, a mechanical property, etc.) of a 3D object to be built. Combining the final surface lattice net 328 with the lattice infill 104 includes surrounding the lattice infill 104 with the final surface lattice net 328 so that the final surface lattice net 328 defines an external surface of the 3D object to be built.

The process 200 generates (at 216) a digital representation (e.g., a CAD file) of the 3D object based on the combined lattice structure. For example, information of the combined lattice structure can be included in the digital representation, along with other information defining properties associated with portions of the combined lattice structure. The digital representation can be communicated to an additive manufacturing machine to build the 3D object based on the combined lattice structure.

Figure 4:
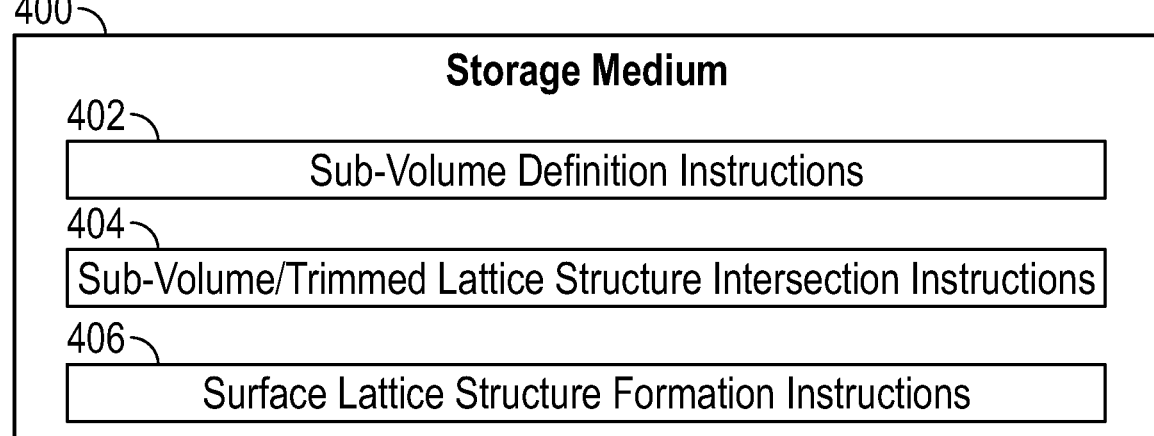
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause a system to perform various tasks.

The machine-readable instructions include sub-volume definition instructions 402 to define sub-volumes within a bounding object (e.g., 304 in FIG. 3A) based on beams of a unit cell (e.g., 302 in FIG. 3A) of a lattice structure for a 3D object to be built. The sub-volumes are defined based on the beams cutting through the bounding object that contains the unit cell. As explained above, information can be derived based on the sub-volumes to connect the trimmed unit cells at the external surface of a lattice infill to a surface lattice net.

The machine-readable instructions further include sub-volume/trimmed lattice structure intersection instructions 404 to intersect the sub-volumes of the bounding object with a trimmed version of the lattice structure (e.g., the lattice infill 104 of FIG. 1B). The intersecting of the sub-volumes of the bounding object with the trimmed version of the lattice structure allows for an identification of the points at which beams of unit cells of a surface lattice structure are to connect to the lattice infill.

The machine-readable instructions further include surface lattice structure formation instructions 406 to form a surface lattice structure having beams identified based on the intersecting, where the beams of the surface lattice structure to connect to unit cells of the trimmed version of the lattice structure. The surface lattice structure can be combined with the trimmed version of the lattice structure to form a combined lattice structure, where the surface lattice structure defines an external surface of the 3D object to be built.

In some examples, the surface lattice structure can be combined with the trimmed version of the lattice structure by surrounding the trimmed version of the lattice structure with the surface lattice structure.

In some examples, the combining of the surface lattice structure with the trimmed version of the lattice structure connects beams of unit cells of the surface lattice structure with the unit cells of the trimmed version of the lattice structure. The beams of the unit cells of the surface lattice structure correspond to curves at intersection points identified based on the intersecting of the sub-volumes of the bounding object with the trimmed version of the lattice structure.

Figure 5:
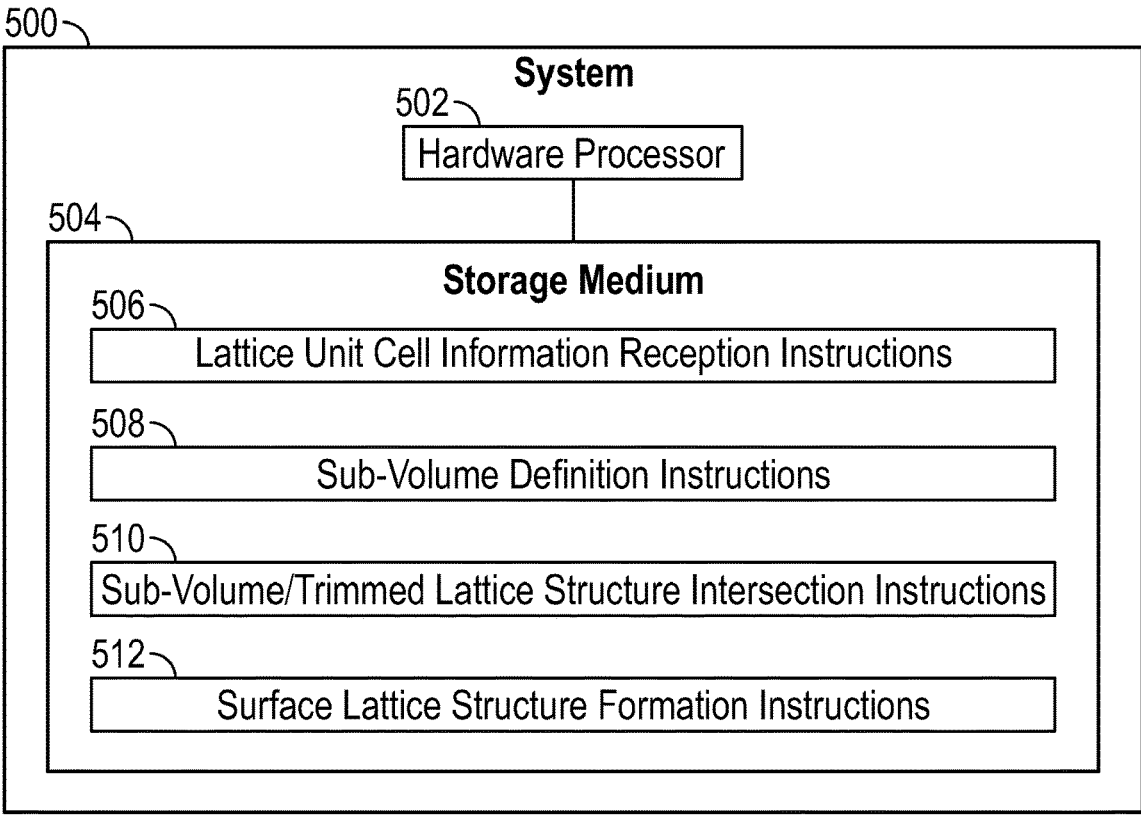
FIG. 5 is a block diagram of a system according to some examples.

FIG. 5 is a block diagram of a system 500 that includes a hardware processor 502 or multiple hardware processors. A hardware processor can include a microprocessor, a core of a multi-core microprocessor, a microcontroller, a programmable integrated circuit, a programmable gate array, or another hardware processing circuit. The system 500 can include a computer system, such as a computer system separate from an additive manufacturing machine. In other examples, the system 500 can include a controller that is part of an additive manufacturing machine.

The system 500 includes a storage medium 504 that stores machine-readable instructions executable on the hardware processor 502 to perform various tasks. Machine-readable instructions executable on a hardware processor can refer to the instructions executable on a single hardware processor or the instructions executable on multiple hardware processors.

The machine-readable instructions in the storage medium 504 include lattice unit cell information reception instructions 506 to receive information of unit cells of a lattice infill (e.g., 104 in FIG. 1B) produced based on trimming an initial lattice structure, where the lattice infill is for building a 3D object.

The machine-readable instructions in the storage medium 504 further include sub-volume definition instructions 508 to define a set of sub-volumes within a bounding object based on beams of a unit cell, where the sub-volumes are defined based on the beams cutting through the bounding object that contains the unit cell.

The machine-readable instructions in the storage medium 504 further include sub-volume/trimmed lattice structure intersection instructions 510 to intersect plural sets of the sub-volumes with unit cells at an external surface of the lattice infill, where the unit cells at the external surface of the lattice infill have beams that have been removed or partially cut by the trimming.

The machine-readable instructions in the storage medium 504 further include surface lattice structure formation instructions 512 to form a surface lattice structure having beams identified based on the intersecting, where the beams of the surface lattice structure are to connect to the unit cells at an external surface of the lattice infill.

Figure 6:
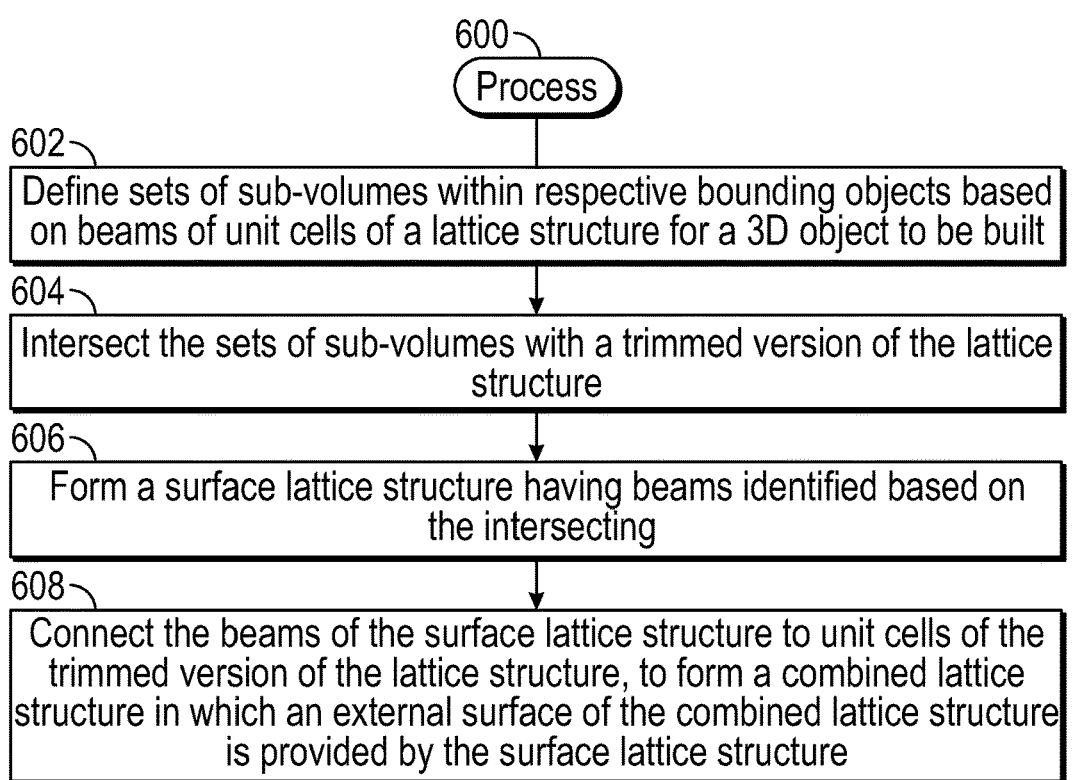
FIG. 6 is a flow diagram of a process according to further examples.

FIG. 6 is a flow diagram of a process 600 according to some examples. The process 600 can be performed by a system including a hardware processor. The process 600 defines (at 602) sets of sub-volumes within respective bounding objects based on beams of unit cells of a lattice structure for a 3D object to be built. The set of sub-volumes within a corresponding bounding object is defined based on the beams of a unit cell contained in the corresponding bounding object cutting through the corresponding bounding object.

The process 600 intersects (at 604) the sets of sub-volumes with a trimmed version of the lattice structure.

The process 600 forms (at 606) a surface lattice structure having beams identified based on the intersecting.

The process 600 connects (at 608) the beams of the surface lattice structure to unit cells of the trimmed version of the lattice structure, to form a combined lattice structure in which an external surface of the combined lattice structure is provided by the surface lattice structure.

Using techniques or mechanisms according to some implementations of the present disclosure, a 3D object built using lattice structures with complex geometries can be built while still retaining target properties of an external surface of the 3D object. A surface lattice net can be formed that connects to a trimmed version of a lattice structure, and the surface lattice net can be combined with the trimmed version of the lattice structure to provide a combined lattice structure that can be included in a digital representation to allow the 3D object to be built by an additive manufacturing machine. In this manner, a separate outer skin for a 3D object does not have to be separately built for attachment to 3D part built based on the trimmed version of the lattice structure.

A storage medium (e.g., 400 in FIG. 4 or 504 in FIG. 5) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium storing instructions that upon execution cause a system to:
   define plural sets of sub-volumes within corresponding bounding objects based on beams of corresponding unit cells of a lattice structure for a three-dimensional (3D) object to be built,
      wherein for each plural set, the sub-volumes of the plural set are defined based on the beams cutting through the corresponding bounding object of the plural set;
   intersect an array of the plural sets of the sub-volumes with a trimmed version of the lattice structure, to produce curves at boundaries of the corresponding bounding objects;
   remove the curves from the lattice structure to form a surface lattice structure having beams identified based on intersecting the array with the trimmed version, the beams of the surface lattice structure to connect to unit cells of the trimmed version of the lattice structure; and
   build the 3D object based on the surface lattice structure and the trimmed version of the lattice structure.

2. The non-transitory machine-readable storage medium of claim 1, wherein the instructions upon execution cause the system to:

combine the surface lattice structure with the trimmed version of the lattice structure to form a combined lattice structure, wherein the surface lattice structure defines an external surface of the 3D object to be built.

3. The non-transitory machine-readable storage medium of claim 2, wherein combining the surface lattice structure with the trimmed version of the lattice structure surrounds the trimmed version of the lattice structure with the surface lattice structure.

4. The non-transitory machine-readable storage medium of claim 2, wherein combining the surface lattice structure with the trimmed version of the lattice structure connects the beams of unit cells of the surface lattice structure with the unit cells of the trimmed version of the lattice structure.

5. The non-transitory machine-readable storage medium of claim 4, wherein the beams of the unit cells of the surface lattice structure correspond to the curves at intersection points identified based on intersecting the array with the trimmed version of the lattice structure.

6. The non-transitory machine-readable storage medium of claim 2, wherein the instructions upon execution cause the system to:
   thicken the beams of the surface lattice structure prior to combining the surface lattice structure with the trimmed version of the lattice structure.

7. The non-transitory machine-readable storage medium of claim 2, wherein the instructions upon execution cause the system to:
   generate a digital representation of the 3D object to be built based on the combined lattice structure, wherein the 3D object is built by an additive manufacturing machine using the digital representation.

8. The non-transitory machine-readable storage medium of claim 1, wherein intersecting the array with the trimmed version of the lattice structure also produces other curves corresponding to the beams in unit cells of the surface lattice structure.

9. The non-transitory machine-readable storage medium of claim 8, wherein the instructions upon execution cause the system to:
   identify removal planes at the boundaries of the corresponding bounding objects.

10. The non-transitory machine-readable storage medium of claim 7, wherein the instructions upon execution cause the system to:
   cause the additive manufacturing machine to build the 3D object using the digital representation of the 3D object.

11. A system comprising:
   a processor; and
   a non-transitory machine-readable storage medium storing instructions executable by the processor to:
      receive information regarding a lattice infill produced based on trimming a lattice structure, the lattice infill for building a three-dimensional (3D) object;
      define plural sets of sub-volumes within corresponding bounding objects based on beams of corresponding unit cells,
         wherein for each plural set, the sub-volumes of the plural set are defined based on the beams cutting through the corresponding bounding object of the plural set;
      intersect the plural sets of the sub-volumes with an external surface of the lattice infill, wherein the corresponding unit cells at the external surface of the lattice infill have beams that have been removed or partially cut by the trimming, to produce curves at boundaries of the corresponding bounding objects;

remove the curves from the lattice structure to form a surface lattice structure having beams identified based on intersecting the plural sets with the external surface, the beams of the surface lattice structure to connect to the corresponding unit cells at an external surface of the lattice infill; and build the 3D object based on the surface lattice structure and the lattice infill.

12. The system of claim 11, wherein intersecting the plural sets of the sub-volumes with the external surface of the lattice infill also produces other curves that correspond to the beams of the surface lattice structure.

13. The system of claim 11, wherein the instructions are executable by the processor to:

combine the surface lattice structure with the lattice infill to form a combined lattice structure, wherein the surface lattice structure defines an external surface of the 3D object to be built.

14. The system of claim 13, wherein the instructions are executable by the processor to:

generate a digital representation of the 3D object to be built based on the combined lattice structure, wherein the 3D object is built by an additive manufacturing machine using the digital representation of the 3D object for use by an additive manufacturing machine in building the 3D object.

15. A method comprising:

defining, by a processor, plural sets of sub-volumes within corresponding bounding objects based on beams of corresponding unit cells of a lattice structure for a three-dimensional (3D) object to be built, wherein for each plural set, the sub-volumes of the plural set are defined based on the beams cutting through the corresponding bounding object of the plural set;

intersecting, by the processor, an array of the plural sets of the sub-volumes with a trimmed version of the lattice structure, to produce curves at boundaries of the corresponding bounding objects;

removing, by the processor, the curves from the lattice structure to form a surface lattice structure having beams identified based on intersecting the array with the trimmed version, the beams of the surface lattice structure to connect to unit cells of the trimmed version of the lattice structure;

combining, by the processor, the surface lattice structure with the trimmed version of the lattice structure to form a combined lattice structure, wherein the surface lattice structure defines an external surface of the 3D object to be built;

generating, by the processor, a digital representation of the 3D object to be built based on the combined lattice structure; and causing an additive manufacturing machine to build the 3D object using the digital representation of the 3D object.

* * * * *